Sept. 3, 1957 W. C. KNAPP 2,804,847
PNEUMATICALLY OPERATED RECIPROCATING TOOL
Filed Aug. 1, 1956 2 Sheets-Sheet 1
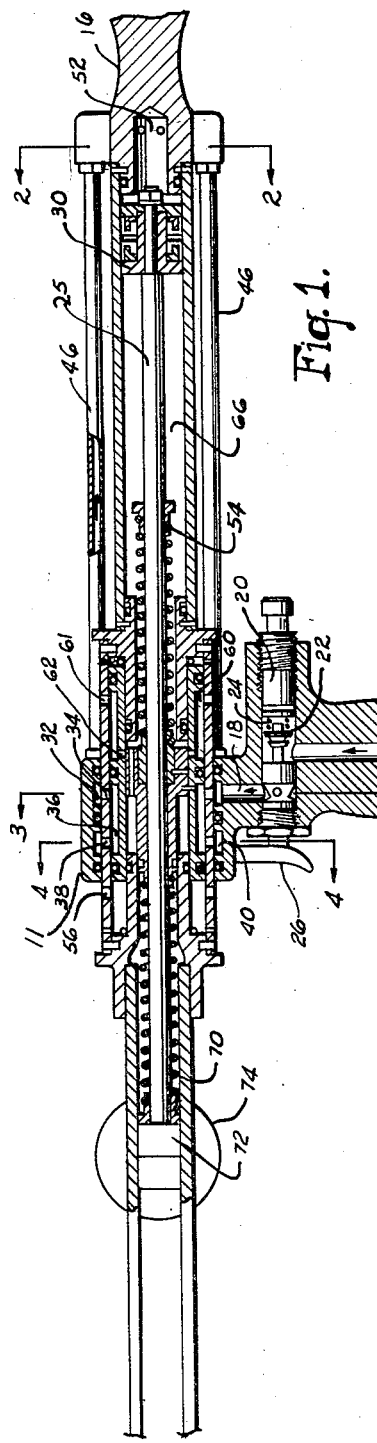
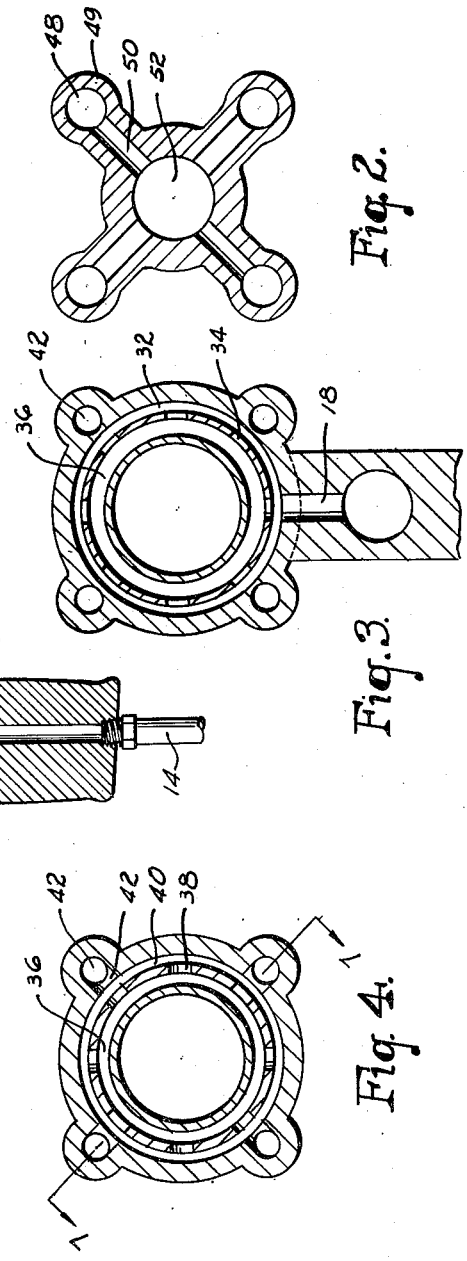
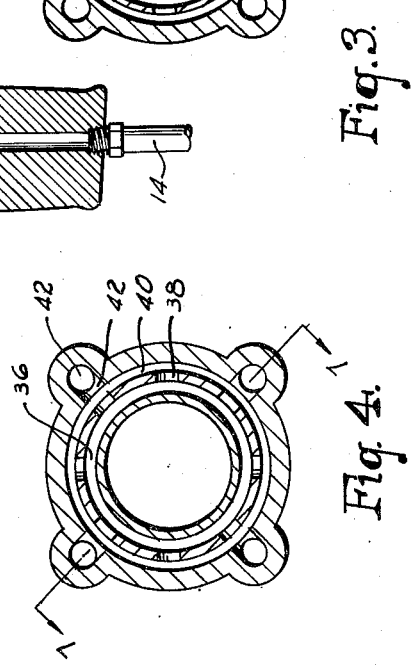
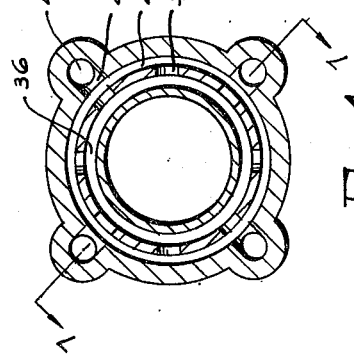
INVENTOR.
Wallace C. Knapp
BY
Louis Necko Sept. 3, 1957 W. C. KNAPP 2,804,847
PNEUMATICALLY OPERATED RECIPROCATING TOOL
Filed Aug. 1, 1956 2 Sheets-Sheet 2

INVENTOR.
Wallace C. Knapp
BY
Louis Necho

United States Patent Office 2,804,847
Patented Sept. 3, 1957

2,804,847

PNEUMATICALLY OPERATED RECIPROCATING TOOL

Wallace C. Knapp, Drexel Hill, Pa.

Application August 1, 1956, Serial No. 601,485

4 Claims. (Cl. 121—3)

My invention relates to a pneumatically operated reciprocating tool and the object of the invention is to produce an improved tool of this type.

The nature of the invention will be understood from the following specification and the accompanying drawings in which:

Fig. 1 is a vertical, longitudinal sectional view of a tool embodying my invention.

Figs. 2, 3 and 4 are sectional views taken on lines 2—2, 3—3, and 4—4 on Fig. 1, respectively.

Figure 5:
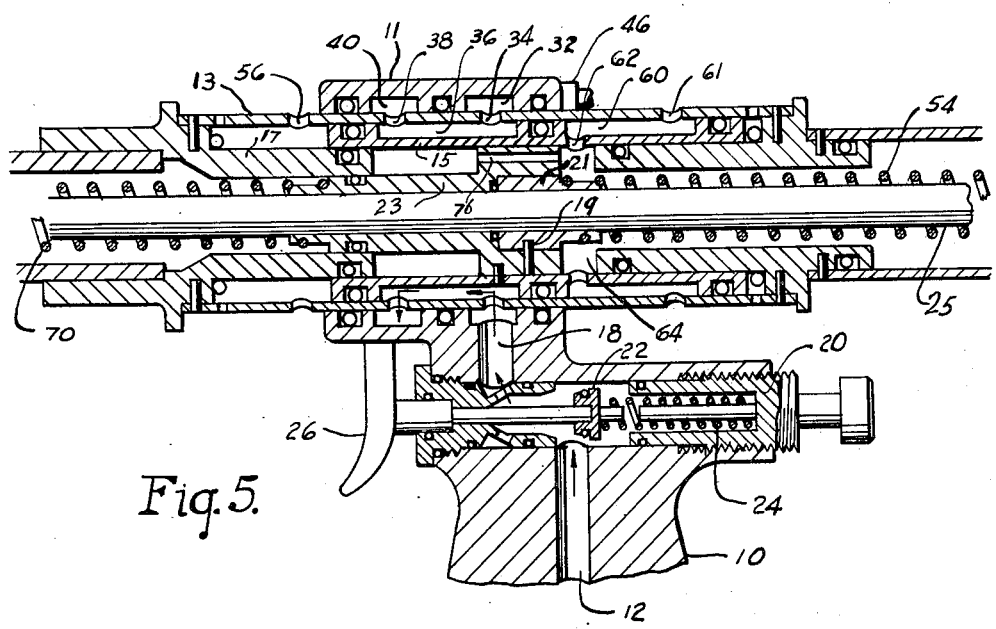
Figure 6:
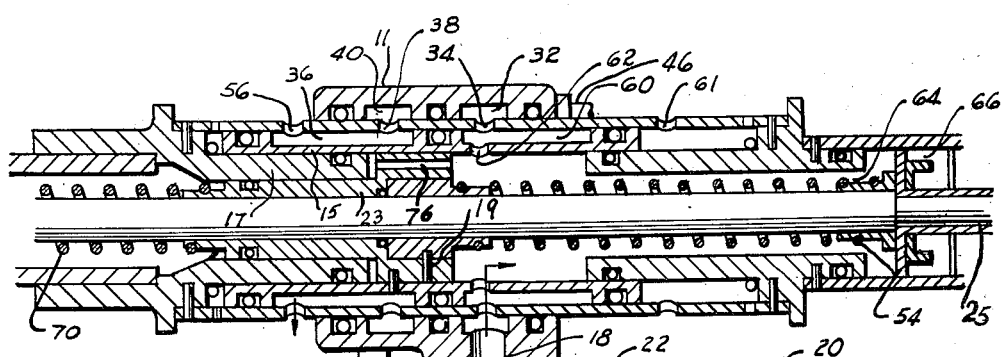
Figure 7:
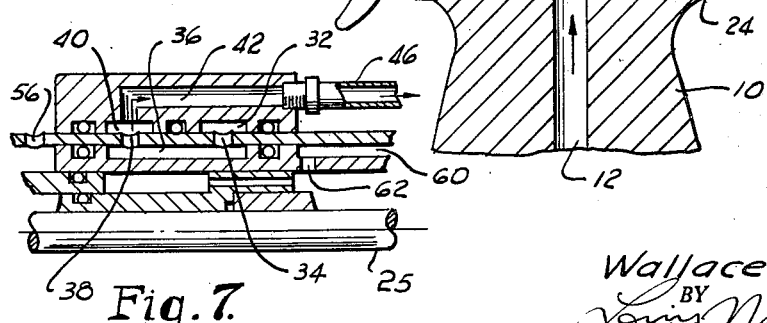

Figs. 5, 6 and 7 are enlarged, fragmentary vertical sectional views showing the manner in which the tool operates.

The tool illustrated includes a handle 10 which is provided with a bore 12 for receiving air under pressure from a suitable source 14 and with a second handle 16 which is disposed at an angle to handle 10 and which facilitates manipulation of the tool.

The flow of air from bore 12 into offset bore 18 is controlled by a combined shut-off valve and speed regulator which includes an adjustable stop 20, a valve 22 adapted to close the adjacent end of bore 18 and a compression spring 24 which normally biases valve 22 to its closing position, or to the left, as viewed in Figs. 1, 5 and 6. To permit flow of air from bore 12 to bore 18, valve 22 is moved to the right, as viewed in these figures, by the exertion of pressure on trigger 26 sufficient to overcome the force of spring 24. To regulate the flow of air and, hence, the rate of reciprocation, stop 20 is moved to the right, as viewed in Figs. 1, 5 and 6, to increase the extent to which valve 22 may be opened, and vice versa. Stop 20 is preferably threaded in position so that its adjustment may be effected by turning it in one direction or the other.

Handle 10 carries, or has integrally formed with it, a fixed outer casing 11 which coacts with fixed outer sleeve 13 to form a first outer annular chamber 32 which communicates, through ports 34 and through annular chamber 36 and ports 38 with a second outer annular chamber 40 which is also formed between casing 11 and sleeve 13. Chamber 36 is formed between fixed sleeve 13 and a longitudinally reciprocable sleeve 15, the left hand end of which at all times slidably engages sleeve 17 which is carried by sleeve 13. See Figs. 5 and 6. Sleeve 15 is integrated, by means of pin 19, with a bushing 21 which abuts, or which may be an extension of, bushing 23. Bushings 21 and 23 reciprocably support piston rod 25 which will be hereinafter further referred to.

As best shown in Fig. 7, outer chamber 40 communicates, through passages 42 with pipes 46. Pipes 46 terminate in openings 48 which communicate through passages 50, with a chamber 52 which, in the extreme position shown in Fig. 1 is closed by piston 30. Holes 48 and passages 50 are preferably formed in a casting 49 carried by handle 16 and chamber 52 is preferably formed in the inner end of handle 16. See Fig. 1.

From this point on, it is thought best to describe the remaining parts in connection with the operation of the tool and reference will first be made to Figs. 1, 5 and 7 in which the parts are shown in the position which they assume when the piston 30 has reached the end of its stroke in one direction and is ready to begin its stroke in the opposite direction.

When the parts are in the position of Figs. 1, 5 and 7, compressed air flows from bore 18 into outer annular chamber 32 and through ports 34 and intermediate annular chamber 36 and ports 38 into outer chamber 40. From chamber 40 the air flows through passages 42 and through holes 48 and passages 50 into chamber 52 to move piston 30 and piston rod 25 to the left as shown in Fig. 1. As piston 30 approaches the end of its leftward stroke it compresses spring 54. Compression of spring 54 moves bushings 21 and 23 and sleeve 15, which forms travelling chamber 36, to the left, as viewed in Fig. 1, until the left hand end of chamber 36 registers with exhaust ports 56 while its right hand end continues to register with outer chamber 40 to relieve the pressure against the right hand face of piston 30. See Fig. 6.

Sleeve 15 is extended to the right, as viewed in the drawings, to form a second travelling chamber 60 which does not communicate, but which is movable jointly, with travelling chamber 36. Therefore, when the parts reach the extreme left hand position of Fig. 6, the left hand portion of travelling chamber 60 will register with air inlet port 34 and its right hand portion will be to the left of, and out of registration with exhaust ports 61. Compressed air will now flow from bore 18 into chamber 60 and will flow out of chamber 60, through ports 62, into piston cylinder 64 to move piston 30 to the right as viewed in Fig. 1. When the piston again reaches the extreme right hand position of Fig. 1, the right hand portion of chamber 60 registers with previously mentioned exhaust port 61 to relieve the pressure in piston cylinder 64 and the parts will be ready to begin a new cycle of operation.

As the piston approaches its extreme right hand position, block 72, which carries the tool 74, compresses spring 70 and moves travelling chambers 36 and 60 to the right. Tool 74 may be a sander, a saw, a grinder, etc.

In addition to moving travelling chambers 36 and 60 back and forth, springs 54 and 70 also absorb the energy at the end of each stroke of the piston and thus cushion the operation. It will be noted that travelling chambers 36 and 60 are moved by compression of springs 54 and 70 only and independently of the stroke of the piston rod except for prior predetermination of the point at which, during their movements, piston 30 and block 72 will begin to compress the precalibrated springs. This makes it possible to make the stroke of the piston of any desired length while restricting the movement of chamber 36 to the minimum necessary alternately to admit air into, and to exhaust air from said chambers. In order not to interfere with the accurately precalibrated action of the springs, I provide bypass 76 which constantly equalizes air pressure in cylinder 64 on either side of the movable bushings.

Because springs 54 and 70, and chambers 36 and 60 and the other parts which are reciprocated by said springs are all concentric with the piston 30 and with piston rod 25, perfect balance is achieved which, in turn produces very smooth operation of the tool. Smooth operation not only makes use of the machine easier, but it also prolongs the life of the machine as compared with devices in which the movement of parts or the cushioning of the shock is effected by springs or other expedients which are eccentric to the axis of movement of the piston and the tool carried thereby.

What I claim is:

1. A pneumatically operated reciprocating tool including a cylinder, a piston rod mounted for reciprocation in said cylinder, a travelling chamber concentric with said piston rod, first and second compression spring concentric with said piston rod and operable, upon compression, to move said travelling chamber to a first extreme position in one direction and to a second extreme position in the opposite direction, valve controlled means for supplying compressed fluid, there being an inlet port so located as to communicate with said travelling chamber when the latter is in its first extreme position, and there being an exhaust port so located as to communicate with said travelling chamber when the latter is in its second extreme position, a piston carried by one end of said piston rod and engageable upon movement of said piston rod in one direction with said first spring to compress the latter and move said travelling chamber to its first position, and a tool carried by the other end of said piston rod and engageable upon movement of said piston rod in the opposite direction, with said second spring to compress the latter and move said travelling chamber to its second position.

2. A reciprocating pneumatically operated tool including a cylinder, a casing enclosing a portion of said cylinder and coacting with the outer surface thereof to form fixed spaced, non-communicating, first and second annular chambers, there being spaced first and second ports in the wall of said portion of said cylinder which communicate with said first and second annular chambers, respectively, a piston rod mounted for reciprocation within said cylinder, a sleeve mounted for reciprocation within said cylinder and coacting therewith to form a first elongated travelling chamber, the length of said travelling chamber being such that, in a first extreme position thereof said travelling chamber spans both of said ports and establishes communication between said first and second annular chambers and, in a second extreme position thereof, said travelling chamber communicates with said second chamber only, a piston carried by one end of said piston rod, a tool carried by the other end of said piston rod, valve controlled means for supplying a compressed fluid to said first annular chamber through said first port through said travelling chamber, and through said second port, to said second annular chamber, and a passage leading from said second annular chamber, to the outer end of said cylinder to exert pressure on the outer side of said piston to move said piston rod in one direction relative to said cylinder, there being an exhaust port formed in the wall of said cylinder and so located that, in its second extreme position, said travelling chamber will establish communication between said second annular chamber and said exhaust port to relieve the pressure against the outer side of said piston.

3. The structure recited in claim 2 in which said sleeve is extended to form a second travelling chamber which is movable with, but does not communicate with, said first mentioned travelling chamber, there being a third port in a wall of said second travelling chamber which establishes communication between said second travelling chamber and said cylinder, said port being so located that in one extreme position of said second travelling chamber compressed fluid will flow from said valve controlled means through said first port, through said second travelling chamber and through said third port into said cylinder to exert pressure on the inner side of said piston, there being a second exhaust port formed in the wall of said cylinder and so located that in the other extreme position of said second travelling chamber compressed fluid would be exhausted from said cylinder through said third port and through said second exhaust port to relieve the pressure on the inner side of said piston.

4. The structure recited in claim 3 and a first compression spring disposed to one side of, and engageable with, one side of travelling chambers and a second compression spring disposed to, and engageable with, the other side of said travelling chambers, said springs being so calibrated and located with reference to the movement of said piston rod that movement of the piston rod in one direction brings said piston into engagement with said first spring to compress the latter and move said travelling chambers to their second position and so that movement of said piston rod in the opposite direction brings said tool into engagement with said second spring to compress the latter and move said travelling chambers to their first position.

No references cited.